United States Patent
Khafagy et al.

(10) Patent No.: US 10,024,291 B1
(45) Date of Patent: Jul. 17, 2018

(54) ENGINE START AND STOP CONTROL

(71) Applicant: Ford Global Technologies, LLC, Dearborn, MI (US)

(72) Inventors: Hafiz Shafeek Khafagy, Dearborn, MI (US); Mohannad Hakeem, Dearborn, MI (US); Mahmud Salam, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/597,424

(22) Filed: May 17, 2017

(51) Int. Cl.
*F02N 11/08* (2006.01)

(52) U.S. Cl.
CPC .. *F02N 11/0837* (2013.01); *F02N 2200/0801* (2013.01); *F02N 2200/102* (2013.01); *F02N 2200/124* (2013.01)

(58) Field of Classification Search
CPC ........... F02N 11/0837; F02N 2200/102; F02N 2200/124; F02N 2200/0801; F02D 2200/702; B60W 2550/14
USPC ......... 123/179.3, 179.4; 73/114.12; 701/112, 701/113, 117
See application file for complete search history.

(56) References Cited

U.S. PATENT DOCUMENTS

| | | | | |
|---|---|---|---|---|
| 6,135,920 | A * | 10/2000 | Kamiya | B60W 10/06 477/185 |
| 6,334,834 | B1 * | 1/2002 | Mizutani | B60T 13/585 477/203 |
| 8,594,912 | B2 | 11/2013 | Weaver | |
| 9,045,132 | B1 | 6/2015 | Zhao et al. | |
| 9,046,047 | B2 * | 6/2015 | Sangameswaran | F02D 29/02 |
| 2003/0004635 | A1 * | 1/2003 | Kamiya | B60W 10/06 701/112 |
| 2003/0022755 | A1 * | 1/2003 | Mizutani | F02D 41/0225 477/107 |

* cited by examiner

*Primary Examiner* — Hai Huynh
(74) *Attorney, Agent, or Firm* — Brooks Kushman P.C.

(57) ABSTRACT

A vehicle includes an engine and a brake system. The vehicle includes a controller configured to maintain an ignition state of the engine such that changes in an ignition state between engine start and engine stop are inhibited during a pressurization of the brake system that is prompted by the indication and initiated prior to brake pedal application. The maintained ignition state is responsive to receiving an indication of a degraded road condition from a source in a vicinity of the vehicle.

20 Claims, 5 Drawing Sheets

ENGINE START AND STOP CONTROL

TECHNICAL FIELD

This disclosure relates to engine start and stop control for vehicles.

BACKGROUND

Vehicles with internal combustion engines may start and stop to conserve fossil fuels. The engine may be stopped by turning off the ignition or shutting down the fuel supply. The engine may be stopped while the vehicle is standing at a stop light. The engine may also be stopped in preparation for a vehicle stop. For example, the engine may be stopped when the vehicle brakes are applied and the vehicle speed is below a particular speed. Engine stops and starts may reduce power available to auxiliary devices during degraded road conditions.

SUMMARY

A vehicle includes an engine and a brake system. The vehicle includes a controller configured to maintain an ignition state of the engine such that changes in an ignition state between engine start and engine stop are inhibited during a pressurization of the brake system that is prompted by the indication and initiated prior to brake pedal application. The maintained ignition state is responsive to receiving an indication of a degraded road condition from a source in a vicinity of the vehicle.

The controller may be further configured to, responsive to the indication subsiding, start the engine. The controller may be further configured to, responsive to the indication subsiding, stop the engine. The degraded road condition may be a reduced friction coefficient. The reduced friction coefficient may be caused by inclement weather. The vehicle may have a nonzero velocity during the maintaining. The controller may be further configured to maintain the ignition state responsive to the receiving only if a speed of the vehicle is less than a predetermined threshold. The vehicle and a path of the source may intersect.

A vehicle includes a power steering system. The vehicle includes a controller configured to maintain an ignition state of an engine of the vehicle such that at least one of engine starts and stops are inhibited until the indication subsides such that sufficient energy available to the powered steering system necessitated by the indication. The controller maintains the ignition state responsive to receiving an indication of a degraded road condition through designated short range communications (DSRC) from a source in the vicinity of the vehicle.

A vehicle includes a controller configured to maintain an ignition state of an engine of the vehicle such that at least one of engine starts and stops are inhibited until the indication subsides such that auxiliary vehicle systems prompted by the indication are powered. The controller may be configured to maintain the ignition state responsive to receiving an indication of a degraded road condition through designated short range communications (DSRC) from a source in the vicinity of the vehicle and a vehicle speed below a predetermined threshold.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Various vehicles employ start and stop features to improve fuel economy. Static start and stop may be performed while the vehicle is at rest, while rolling start and stop may be performed while the vehicle is in motion (e.g., rolling). Rigid implementation of start and stop features may cause sluggish vehicle performance because high electrical current is required to start the vehicle engine. This high current draw may limit power available to other powered components. For example, power steering may require 95 A, which may be unavailable while the engine is cranked. Further, stopping the engine may require auxiliary loads to draw electricity from storage locations, instead of drawing electricity from the alternator. This power storage draw may limit power available to auxiliary loads (e.g., brake systems, power steering, auxiliary systems) and may become depleted or otherwise unavailable over time. The start and stop features may be inhibited during degraded road conditions to ensure availability of auxiliary systems necessary to deal with the degraded condition.

Indication of the degraded road condition may be received from another vehicle in the vicinity. For example, the other vehicle may detect a degraded road condition and transmit an indication of the degradation to the vehicle such that start and stops are inhibited until the indication subsides or the vehicle has traversed the degraded road condition. A degraded road condition may be caused by inclement weather, road work, or other circumstances.

Figure 1:
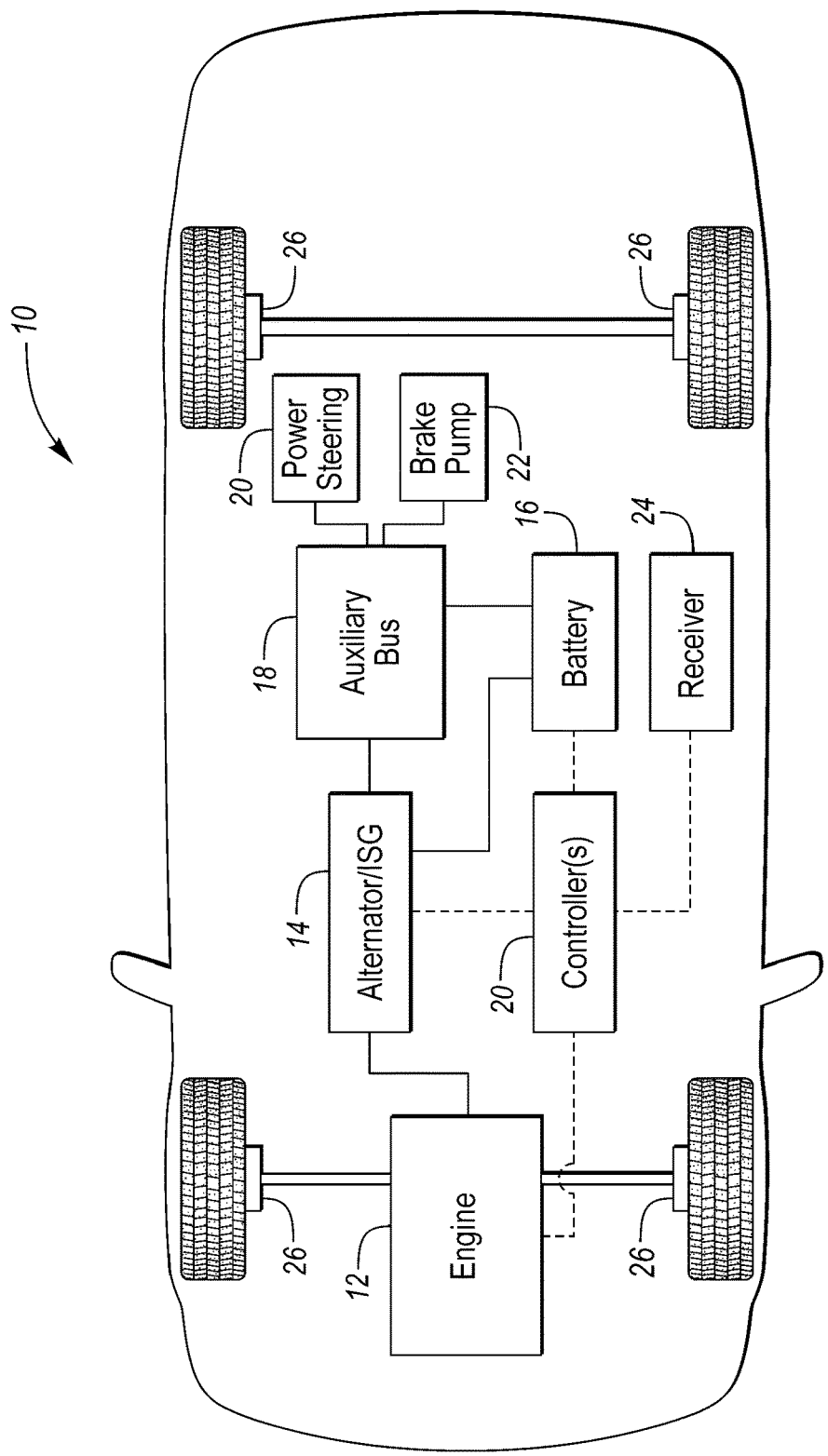
FIG. 1 is a schematic diagram of a vehicle.

Referring to FIG. 1, a vehicle 10 may include an engine 12, ISG 14, battery 16, electrical bus 18, and controller 20. The engine may have a direct mechanical linkage to the ISG 14. The ISG may be electrically connected to the battery 16 and electrical bus 18. The battery 16 may be connected to the electrical bus 18. The controller 20 may be in communication with the engine 12, ISG 14, and battery 16. The electrical bus 18 may provide power to vehicle systems such as an electrical power steering unit 20, a brake booster pump 22, or other vehicle systems. Other systems may include a transmission system or energizing an active or magnetic suspension of the vehicle. For example, a magnetic suspension may require energy to ensure wheel contact with a road surface is maximized. The power steering 20 allows a driver to properly direct the vehicle during degraded road conditions. The brake booster pump 22 ensures brake pressure is available and brakes are responsive during degraded road conditions.

The power steering unit 20 or brake booster pump 22 may be energized during system transients to reduce energy consumption. The brake booster pump 22 may pressurize a hydraulic brake system, including brakes 26. The vehicle 10 may include a receiver 24 for receiving an indication from a source of a degraded road condition.

Figure 2:
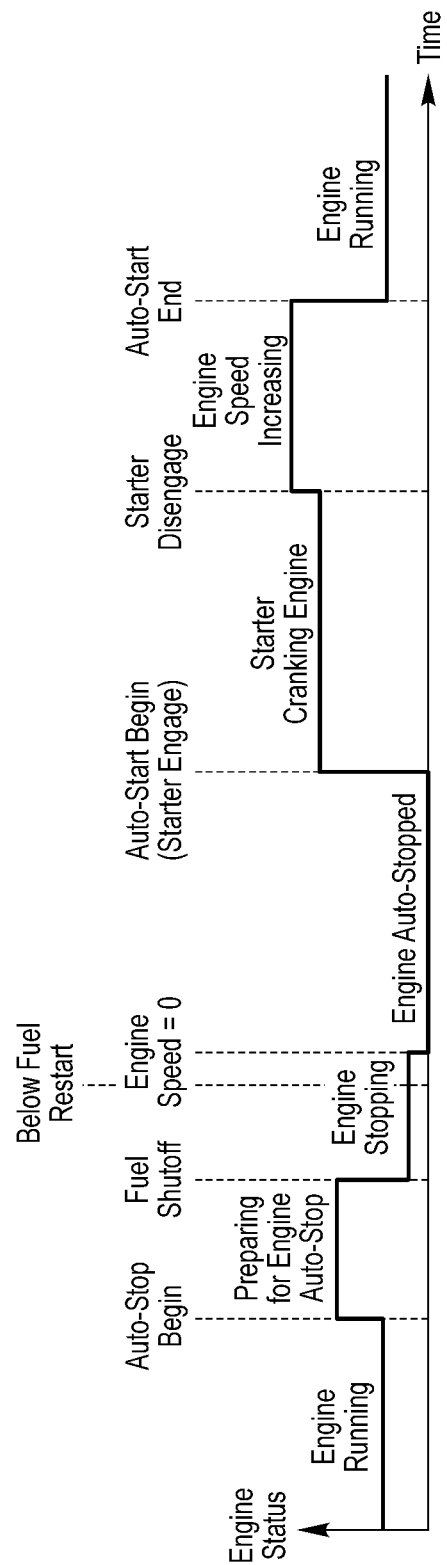
FIG. 2 is a timeline of an engine start and stop sequence.

Referring to FIG. 2, an engine auto-stop event may include several stages. "Auto-stop begin" marks the beginning of the engine auto-stop event. "Preparing for engine auto-stop" is the time period during which vehicle systems as well as the engine are prepared for the impending engine stop. "Fuel shutoff" marks the point at which fuel flow to the engine is stopped. "Engine stopping" is the time period during which the engine speed reduces to 0. "Below fuel restart" marks the point where if a restart is requested during the "engine stopping" stage, the starter may need to be engaged to crank the engine (if a restart is requested before "below fuel restart" and during the "engine stopping" stage, the engine may be restarted by turning the flow of fuel back on). "Engine speed=0" marks the point at which the engine speed is near or equal to 0. "Engine auto-stopped" is the time period during which the engine is off. "Starter engage" marks the point at which the starter starts to crank the engine in an effort to start the engine (in response to detecting an engine auto-start condition). "Starter cranking engine" is the time period during which the engine is unable to crank under its own power. During re-crank electric power steering, brake pressurization, or other auxiliary loads may be disabled because the start over drains the battery. Meaning, power steering or other auxiliary systems may be disabled for 700 ms to allow the engine to reach idle speed and 2-300 ms for the power steering to re-engage. "Starter disengage" marks the point at which the engine is able to crank under its own power. "Engine speed increasing" is the time period during which the speed of the engine increases to its running speed (a speed at or above target idle speed). Finally, "auto-start end" marks the point at which the speed of the engine achieves its running speed.

Figure 3:
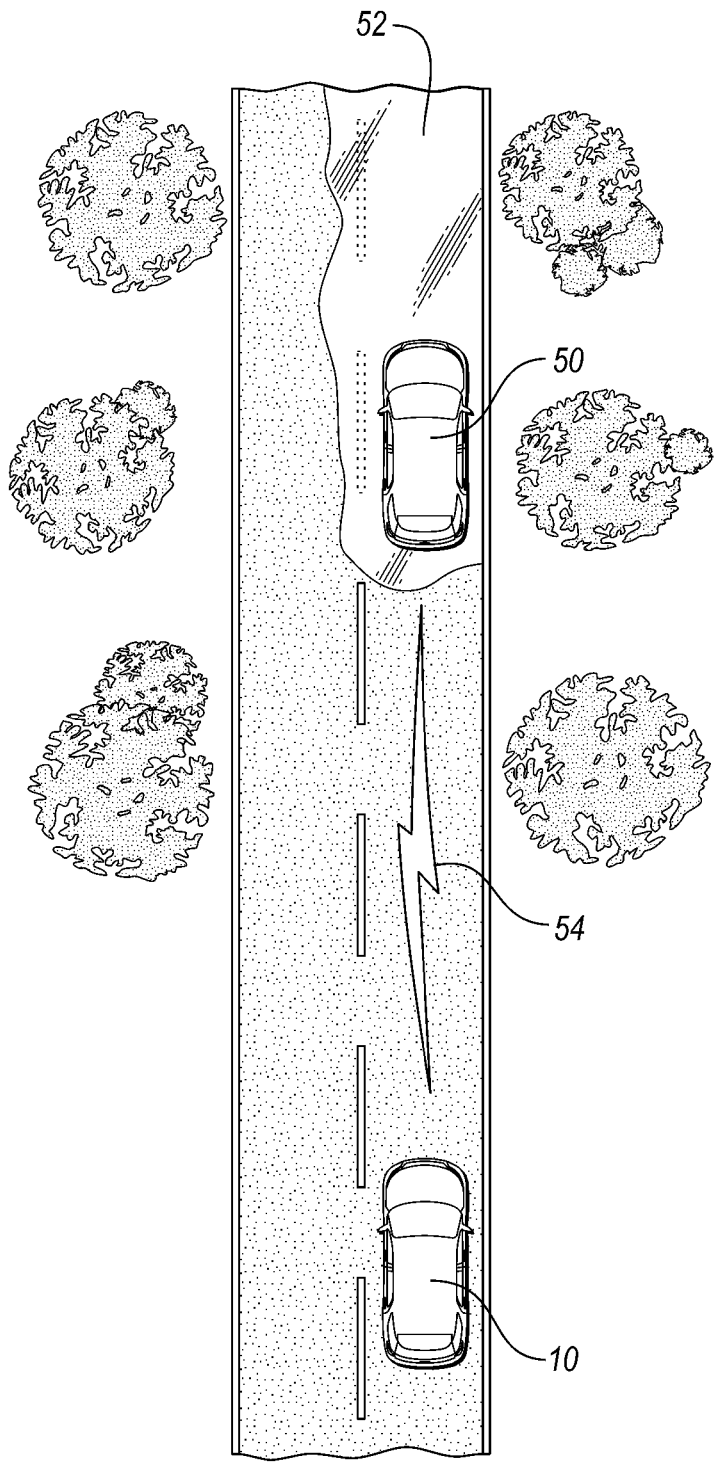
FIG. 3 depicts an indication of a degraded road condition to a vehicle.

Referring to FIG. 3, a source 50 is shown. The source 50 may be a vehicle, an infrastructural component, or other device capable of designated short range communications (DSRC). DSRC may use or include various communications protocols (e.g., Wi-Fi, V2X, or cellular). Any communications protocols may be used to communicate between the source 50 and the vehicle 10. The source 50 may be a vehicle configured to send V2V communications to the vehicle 10. The source 50 may send an indication 54 of the degraded road condition 52. The indication 54 may be a true or false designation. The indication 54 may be an indication of a reduced frictional coefficient associated with the source 50. The indication 54 may be a categorization of the road surface conditions (e.g., icy, wet). An indication of the distance ahead may be communicated between the vehicle 10 and the source 50 to delay start and stop inhibition.

Figure 4:
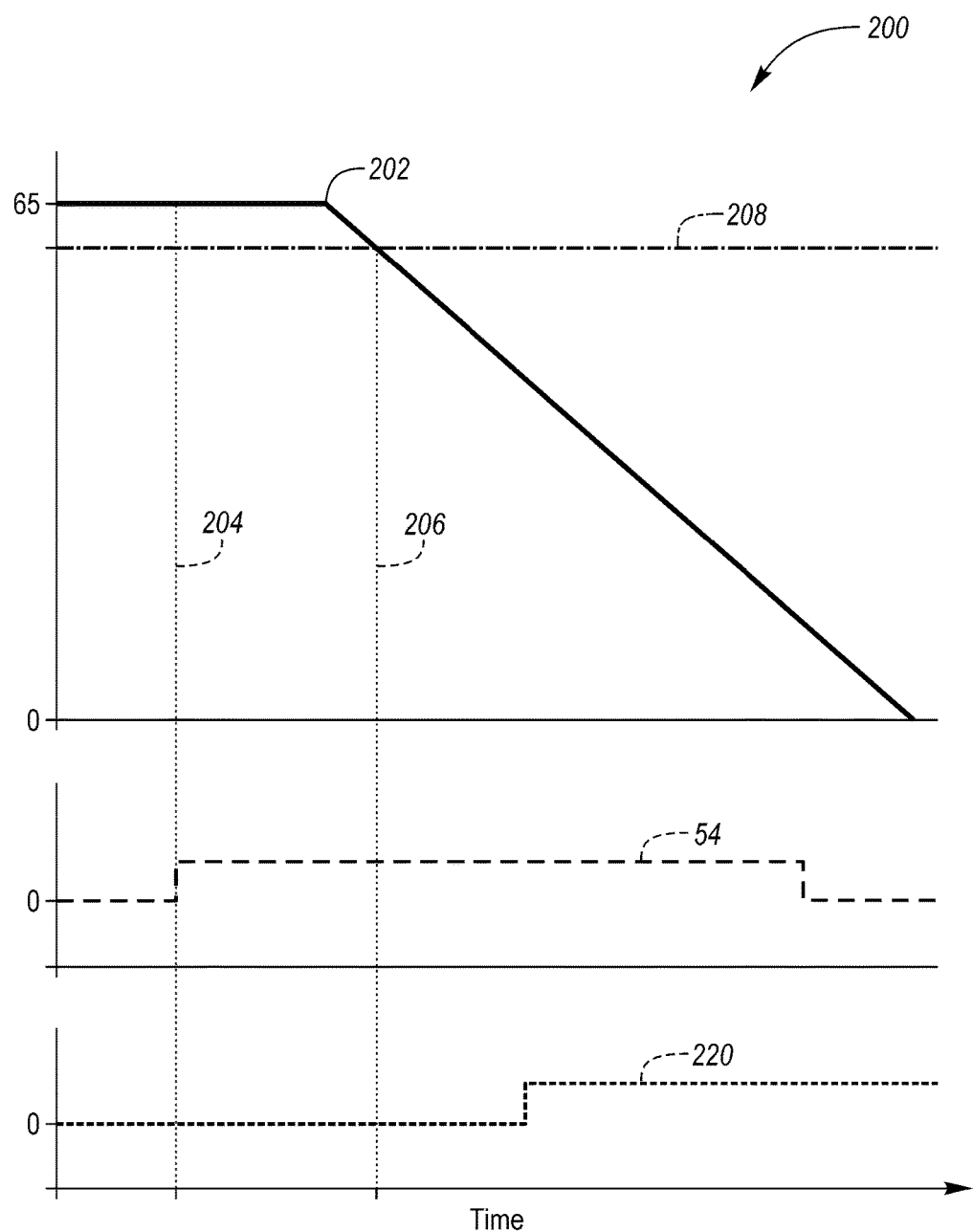
FIG. 4 is a graph indicating the timing of an indication and actuation of system parameters.

Referring to FIG. 4, a timing diagram 200 is shown. The timing diagram 200 includes a vehicle speed indication 202, indication 54 of a degraded road condition, and energizing an auxiliary load 220. The vehicle speed 202 may vary over time. An indication 54 of road degradation may be received at time 204. The vehicle speed 202 may be less than a predetermined vehicle speed threshold 208 at time 206, which would normally allow for engine starts and stops. The indication 54 may inhibit engine starts or stops to ensure that the auxiliary system 220 can energize. The auxiliary system may be a portion of a brake system 22 or a power steering pump 20.

Figure 5:
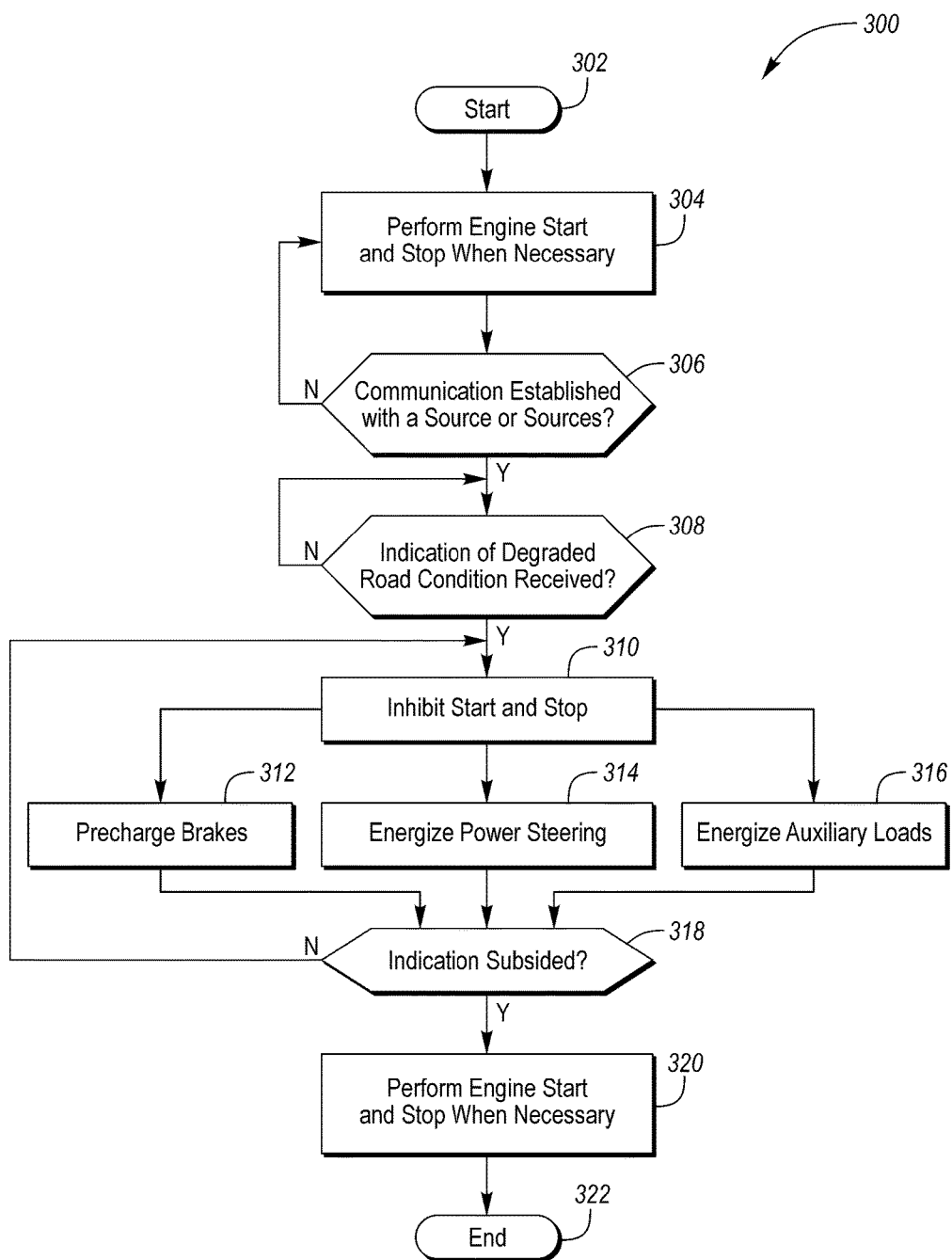
FIG. 5 is a flow diagram of a maintained ignition state.

Referring to FIG. 5, a flow diagram 300 is shown. The flow diagram starts in step 302. In step 304, the controller 20 performs engine starts and stops as necessary. For example, rolling starts and stops or stationary stops and starts may be performed. In step 306, the vehicle 10 may establish communications with the source 50. The vehicle 10 and source 50 may perform a handshake to establish a communications link. In step 308 the vehicle 10 receives an indication 54 of a degraded road condition 52. The indication 54 may inhibit engine start and stop features for a predetermined period or until another indication is sent that the degraded road condition has subsided. For example, the indication 54 may include a delay period based on the distance between the vehicles or the anticipated time for the vehicle to reach the degraded road condition 52. The vehicle 10 may then charge the brakes, energize power steering, or energize other auxiliary loads in step 312, 314, 316. The controller 20 determines whether the indication 54 has subsided or the delay period has lapsed in step 318. In step 320 the vehicle performs engine start and stops as necessary. In step 322 the process ends or continues back at the beginning.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
    an engine;
    a brake system; and
    a controller configured to, responsive to receiving an indication of a degraded road condition from a source in a vicinity of the vehicle, maintain an ignition state of the engine such that changes in the ignition state between engine start and engine stop are inhibited during a pressurization of the brake system that is prompted by the indication and initiated prior to brake pedal application.

2. The vehicle of claim 1, wherein the controller is further configured to, responsive to the indication subsiding, start the engine.

3. The vehicle of claim 1, wherein the controller is further configured to, responsive to the indication subsiding, stop the engine.

4. The vehicle of claim 1, wherein the degraded road condition is a reduced friction coefficient.

5. The vehicle of claim 4, wherein the reduced friction coefficient is caused by inclement weather.

6. The vehicle of claim 1, wherein the vehicle has a nonzero velocity during the maintaining.

7. The vehicle of claim 1, wherein the controller is further configured to maintain the ignition state responsive to the receiving only if a speed of the vehicle is less than a predetermined threshold.

8. The vehicle of claim 1, wherein a path of the vehicle and a path of the source intersect.

9. A vehicle comprising:
an engine; and
a controller configured to, responsive to receiving an indication of a degraded road condition through designated short range communications from a source in a vicinity of the vehicle, maintain an ignition state of the engine such that changes in the ignition state between engine start and engine stop are inhibited until the indication subsides.

10. The vehicle of claim 9, wherein the controller is further configured to, responsive to the receiving, initiate a brake system pressurization prior to brake pedal application and the subsiding.

11. The vehicle of claim 9, wherein the controller is further configured to, responsive to the indication subsiding, start the engine.

12. The vehicle of claim 9, wherein the controller is further configured to, responsive to the indication subsiding, stop the engine.

13. The vehicle of claim 9, wherein the degraded road condition is a reduced friction coefficient.

14. The vehicle of claim 13, wherein the reduced friction coefficient is caused by inclement weather.

15. The vehicle of claim 9, wherein the vehicle has a nonzero velocity during the maintaining.

16. The vehicle of claim 9, wherein controller is further configured to maintain the ignition state responsive to the receiving only if a speed of the vehicle is less than a predetermined threshold.

17. The vehicle of claim 9, wherein a path of the vehicle and a path of the source intersect.

18. A control method for a vehicle, comprising:
responsive to receiving an indication of a degraded road condition from a source in a vicinity of the vehicle and a vehicle speed less than a predetermined threshold, maintaining by a controller an ignition state of an engine such that changes in the ignition state between engine start and engine stop are inhibited until the indication subsides.

19. The control method of claim 18 further comprising, responsive to the receiving, initiating a brake system pressurization prior to brake pedal application and the subsiding.

20. The control method of claim 18, wherein the source is another vehicle.

* * * * *